United States Patent
Dierksmeier et al.

(10) Patent No.: US 11,300,049 B2
(45) Date of Patent: Apr. 12, 2022

(54) INLET GUIDE VANE DRAW HEAT EXCHANGER SYSTEM

(71) Applicant: Rolls-Royce North American Technologies Inc., Indianapolis, IN (US)

(72) Inventors: Douglas David Dierksmeier, Franklin, IN (US); Douglas Boyd, Indianapolis, IN (US); Douglas J. Snyder, Carmel, IN (US); Graham Burkholder, Avon, IN (US); William Barry Bryan, Indianapolis, IN (US)

(73) Assignee: ROLLS-ROYCE NORTH AMERICAN TECHNOLOGIES INC., Indianapolis, IN (US)

(*) Notice: Subject to any disclaimer, the term of this patent is extended or adjusted under 35 U.S.C. 154(b) by 81 days.

(21) Appl. No.: 16/813,491

(22) Filed: Mar. 9, 2020

(65) Prior Publication Data

US 2021/0277827 A1 Sep. 9, 2021

(51) Int. Cl.
| | |
|---|---|
| *F02C 7/042* | (2006.01) |
| *F02C 7/10* | (2006.01) |
| *F02C 9/20* | (2006.01) |
| *F02K 3/06* | (2006.01) |
| *F02K 3/077* | (2006.01) |
| *F02K 3/12* | (2006.01) |
| *F02C 7/18* | (2006.01) |

(52) U.S. Cl.
CPC ............... *F02C 7/042* (2013.01); *F02C 7/10* (2013.01); *F02C 7/18* (2013.01); *F02C 9/20* (2013.01); *F02K 3/06* (2013.01); *F02K 3/077* (2013.01); *F02K 3/12* (2013.01); *F05D 2220/36* (2013.01); *F05D 2260/20* (2013.01)

(58) Field of Classification Search
CPC ... F02C 7/042; F02C 7/10; F02C 9/20; B64D 33/02; B64D 33/10; B64D 2033/024; B64D 2033/0233; B64D 2033/0286
See application file for complete search history.

(56) References Cited

U.S. PATENT DOCUMENTS

| | | | | |
|---|---|---|---|---|
| 3,039,265 | A | | 6/1962 | Williams et al. |
| 3,664,612 | A | * | 5/1972 | Skidmore ............... F02C 7/042 244/53 B |
| 4,791,783 | A | * | 12/1988 | Neitzel ................. F01D 17/162 60/226.3 |

(Continued)

FOREIGN PATENT DOCUMENTS

EP 3 127 807 A1 2/2017

*Primary Examiner* — Alain Chau
(74) *Attorney, Agent, or Firm* — Crowell & Moring LLP

(57) ABSTRACT

A system includes a housing for a gas turbine engine, and a fan disposed in the housing to rotate coaxially with a gas turbine included in the housing. The system also includes an inlet guide vane disposed in the housing in axial alignment with the fan and configured to have an open position where a first flow of air is received by the fan through the inlet guide vane, and a closed position where airflow through the inlet guide vane is obstructed. The system further includes a heat exchanger disposed in a supply passage in fluid communication with a second flow of air received by the fan. The second flow of air is received by the fan via the supply passage with the inlet guide vane in the open position or in the closed position.

20 Claims, 7 Drawing Sheets

(56) References Cited

U.S. PATENT DOCUMENTS

| | | | | |
|---|---|---|---|---|
| 5,056,307 A | * | 10/1991 | Liang | B64D 33/04 60/226.1 |
| 5,431,533 A | * | 7/1995 | Hobbs | F04D 27/0215 415/58.7 |
| 6,634,595 B2 | * | 10/2003 | Koncsek | B64D 33/02 137/15.1 |
| 7,140,174 B2 | * | 11/2006 | Johnson | F02C 7/042 60/226.1 |
| 7,200,999 B2 | * | 4/2007 | Bagnall | F04D 29/526 60/785 |
| 7,770,381 B2 | * | 8/2010 | Johnson | F02K 3/115 60/263 |
| 8,544,256 B2 | | 10/2013 | Junod | |
| 9,062,565 B2 | * | 6/2015 | Mahan | F01D 25/285 |
| 9,145,831 B1 | | 9/2015 | White | |
| 9,840,967 B2 | * | 12/2017 | Snyder | F02C 7/14 |
| 10,294,822 B2 | * | 5/2019 | Caruel | F01D 25/24 |
| 10,364,744 B2 | | 7/2019 | Vaisman et al. | |
| 10,487,738 B2 | * | 11/2019 | Versaevel | B64D 15/04 |
| 10,563,593 B2 | * | 2/2020 | McNeil | F02C 3/04 |
| 11,035,295 B2 | * | 6/2021 | McGee | B64D 33/08 |
| 2003/0132342 A1 | * | 7/2003 | Koncsek | B64D 33/02 244/53 B |
| 2005/0081530 A1 | * | 4/2005 | Bagnall | F04D 29/682 60/785 |
| 2006/0064960 A1 | * | 3/2006 | Johnson | F02C 7/042 60/226.3 |
| 2008/0141655 A1 | * | 6/2008 | Johnson | F02K 3/11 60/226.3 |
| 2011/0076132 A1 | * | 3/2011 | Bottome | F02C 7/05 415/9 |
| 2011/0154801 A1 | * | 6/2011 | Mahan | F01D 25/285 60/39.091 |
| 2014/0369812 A1 | * | 12/2014 | Caruel | B64D 33/02 415/116 |
| 2015/0030445 A1 | * | 1/2015 | Gonidec | F02C 7/047 415/220 |
| 2015/0030446 A1 | * | 1/2015 | Gonidec | F02C 7/047 415/220 |
| 2017/0057649 A1 | | 3/2017 | Rice et al. | |
| 2017/0058831 A1 | | 3/2017 | Bryan et al. | |
| 2017/0122204 A1 | * | 5/2017 | Versaevel | F02C 7/045 |
| 2017/0191427 A1 | * | 7/2017 | McNeil | F02K 3/075 |
| 2017/0356340 A1 | | 12/2017 | Vaisman et al. | |
| 2019/0323429 A1 | * | 10/2019 | McGee | B64D 33/02 |
| 2020/0231293 A1 | * | 7/2020 | Parsons | B64C 29/0033 |
| 2021/0222620 A1 | * | 7/2021 | Modrzejewski | F02C 7/042 |

* cited by examiner

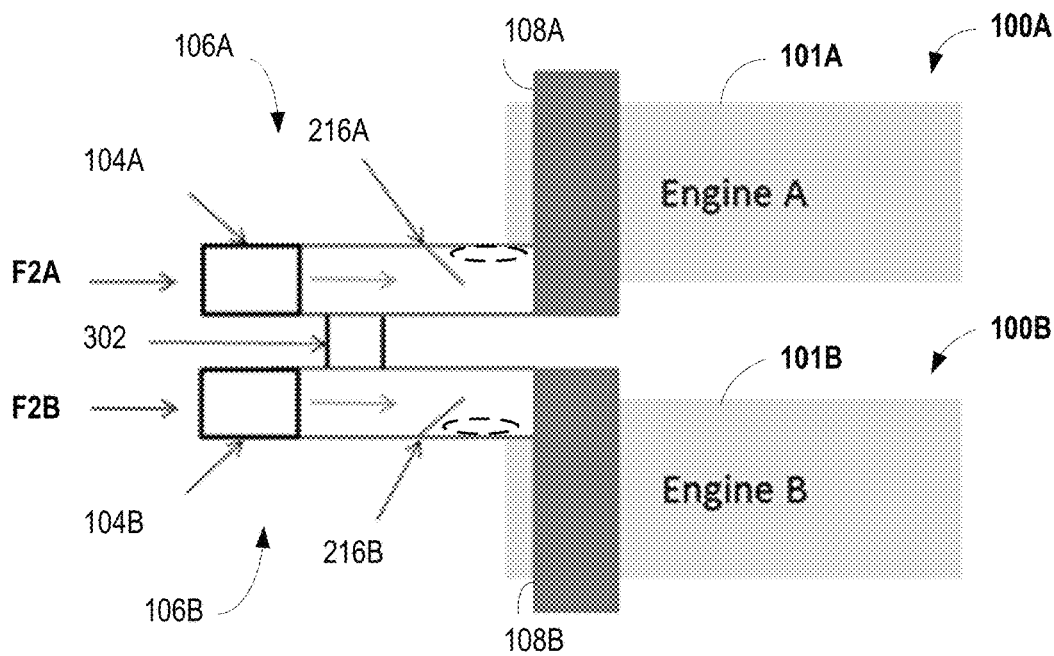
FIG. 3A
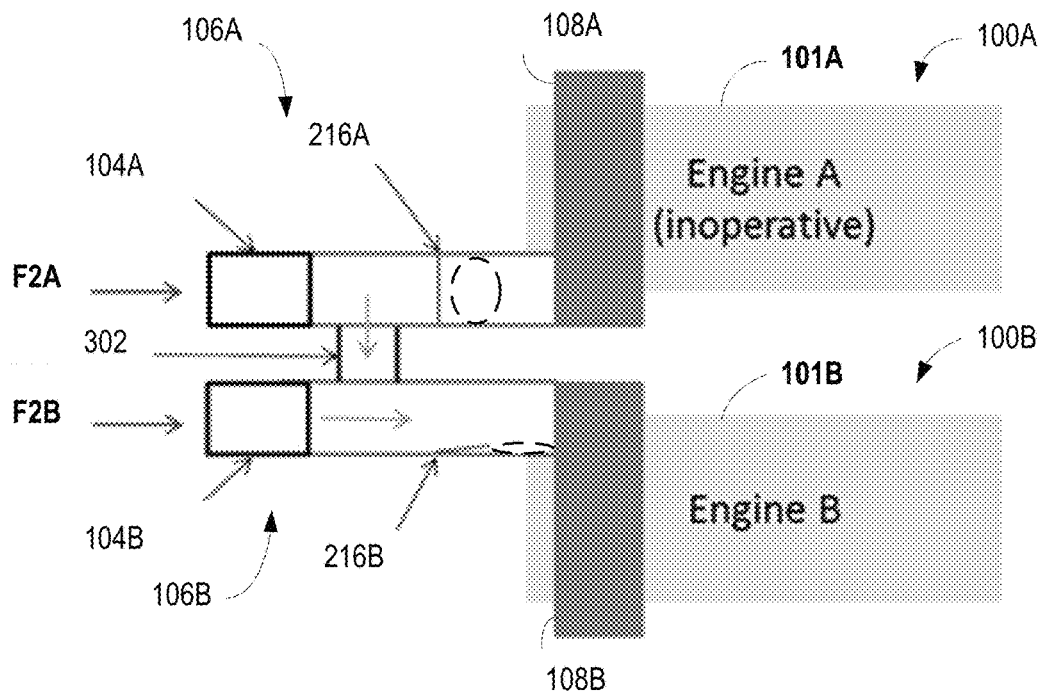
FIG. 3B
FIG. 3

INLET GUIDE VANE DRAW HEAT EXCHANGER SYSTEM

GOVERNMENT RIGHTS

The present application was made with United States government support under Contract No. W911W6-16-2-0011 awarded by the United States government. The United States government may have certain rights in the present application.

TECHNICAL FIELD

This disclosure relates to heat exchangers and, more specifically to an inlet guide vane draw heat exchanger system.

BACKGROUND

Gas turbine engines are used on vehicles such as airplane and helicopters. These engines are internal combustion engines that operate to produce thrust by discharging a high velocity exhaust. Some gas turbine engines can also include fan blades to create thrust.

Gas turbine engines include one or more compressors, a combustor and one or more turbines. Air is compressed in the compressor(s), mixed with fuel in the combustor and ignited, such that exhaust gases are created and discharged through a turbine to create thrust. The exhaust gas rotates the turbine, which is typically used to turn a shaft and produce shaft work output, such as to drive the compressor or a gearbox. There can be one or more turbines and corresponding shafts producing shaft work output. Systems within a gas turbine engine can use the shaft work output.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 3 includes block diagrams 3A and 3B of an example configuration of gas turbine engines;

DETAILED DESCRIPTION

Figure 1:
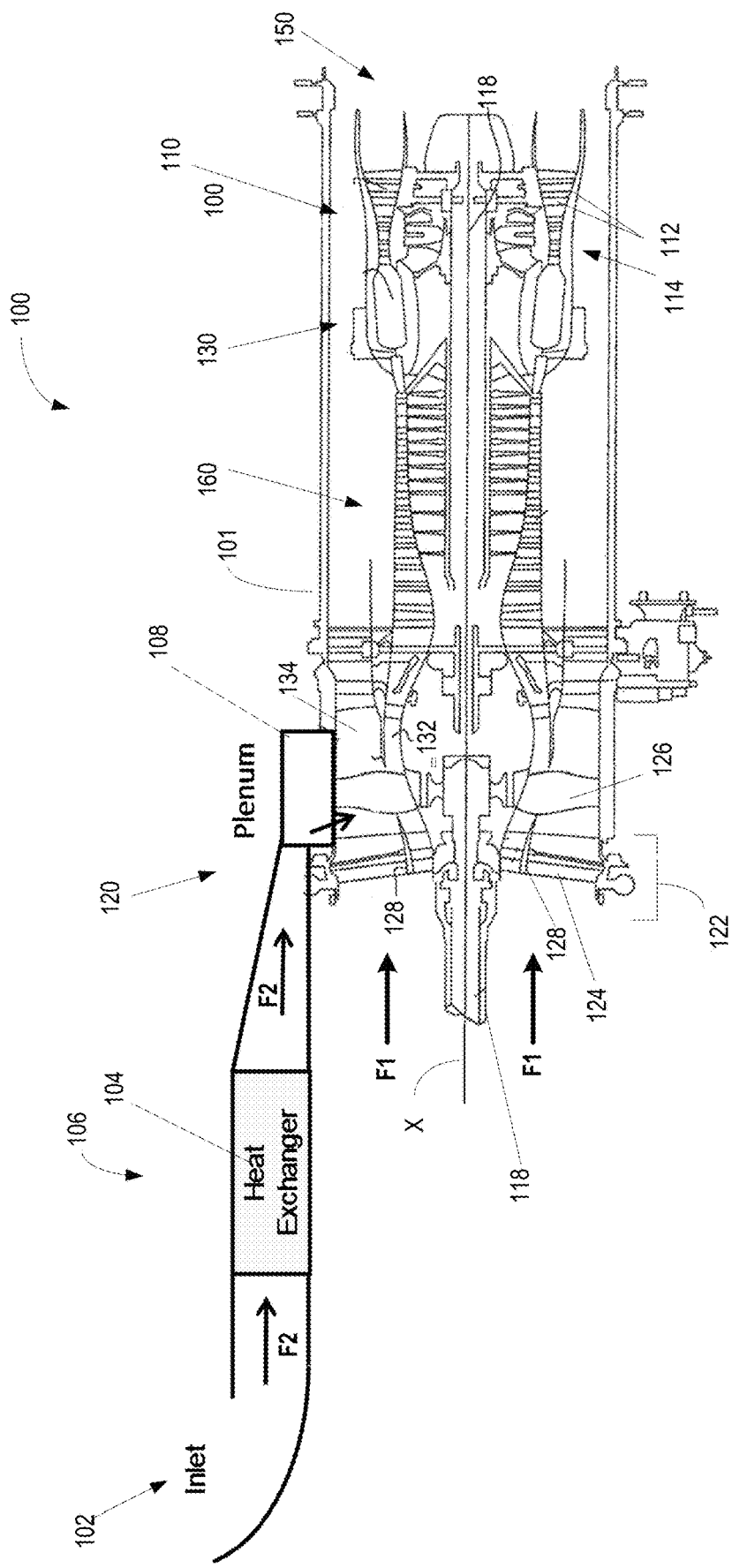
FIG. 1 illustrates a cross-sectional view of an example of a gas turbine engine.

An inlet guide vane (IGV) draw heat exchanger system includes a fan included in a housing of a gas turbine engine, and rotated therewith. The fan may draw a second flow of air (identified as F2 in FIG. 1) into the housing to supply the fan through a heat exchanger disposed in a supply passage based on a pressure differential between the fan and an inlet to the supply passage. An inlet guide vane may be operated in the housing in an open position to supply, through the inlet guide vane, a first flow of air (identified as F1 in FIG. 2) to the fan. The first flow of air (F1) may be supplied to the fan separate from and in addition to the second flow of air (F2) supplied to the fan. The inlet guide vane may be operated in a closed position to restrict supply of the first flow of air (F1) to the fan, but not restrict supply of the second flow of air (F2) to the fan. The second flow of air (F2) being supplied through the heat exchanger disposed in the supply passage.

The inlet guide vane draw heat exchanger system may also include heat exchangers disposed in respective supply passages in fluid communication with a second flow of air (identified as F2 in FIG. 1) received in respective inlets of the respective supply passages. The system may include respective fans included in respective gas turbine engines. Each of the respective fans may be in fluid communication with a respective one of the supply passages. Each of the respective fans may be rotatable to create a pressure differential between the respective fans and respective inlets of the respective supply passages to induce the second flow of air to the respective fans. The system may further include inlet guide vanes included in each of the respective gas turbine engines. The inlet guide vanes may be configured to actuate between an open position to supply a first flow of air (identified as F1 in FIG. 1) to the respective fans, and a closed position to restrict supply of the first flow of air (F1) to the respective fans. The second flow of air (F2) is independent of the first flow of air (F1) such that the second flow of air (F2) is supplied from the respective supply passages to the respective fans while the inlet guide vanes are in the open position or the closed position.

One interesting feature of the system relates to use of a plenum at least partially surrounding a part of the housing and in fluid communication with the fan to uniformly and circumferentially supply the air. Air supplied to the fan in the supply passage may also be in fluid communication with the plenum such that the flow of air provided by the pressure differential may be circumferentially supplied to the fan by the plenum.

Another interesting feature of the system relates to the plenum being in fluid communication with the fan via a plurality of slots formed in the housing. The slots may have a predetermined geometry to circumferentially distribute the second flow of air to the fan in a predetermined pattern, volume, and/or trajectory that is conducive to efficient operation of the gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, a fixed wing vehicle, a variable wing vehicle, a rotary wing vehicle, a tiltrotor vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

As described herein, the gas turbine engine 100 may operate with a convertible configuration in either a turbofan mode or a turboshaft mode. The gas turbine engine 100 may take a variety of forms in various embodiments. Though depicted as an axial flow engine, in some forms the gas turbine engine 100 may have multiple spools and/or may be a centrifugal or mixed centrifugal/axial flow engine. In some forms, the gas turbine engine 100 may be a turbojet or turboprop engine with a convertible configuration. Furthermore, the gas turbine engine 100 may be an adaptive cycle and/or variable cycle engine. Other variations are also contemplated.

The gas turbine engine 100 include a housing 101 in which an intake section 120, a compressor section 160, a combustion section 130, a turbine section 110, and an exhaust section 150 of the gas turbine engine 100 may be arranged as illustrated. The housing 101, which may be referred to as a nacelle, is an enclosure for at least some of the components of the gas turbine engine, which may provide a mechanical interface to surrounding structure. In addition, in some examples the housing 101 may provide a streamline flow path for the flow of air both within the housing 101 and outside the housing 101.

During operation of the gas turbine engine 100 in the turbo fan mode, such as when the vehicle is moving in a forward direction, an inlet fluid flow of air (F1) is received in the intake section 120 by entering an inlet fan duct 122 through inlet guide vanes 124, which are open. In addition, an inlet fluid flow of air F2 is received in the intake section 120 by entering a heat exchanger inlet 102, passing through at least one heat exchanger 104, and supply passage 106 into a plenum 108 for introduction into the inlet fan duct 122 downstream of the inlet guide vanes 124. The F1 and F2 air flows are received in the inlet fan duct 122 and pass through a fan 126 having fan blades. The fan 126 may be a ducted fan having a single stage or multiple stages, to provide operation as a low-bypass turbofan or a high-bypass turbofan. Fluid air flow F1 and F2 may be created by the combination of movement of the vehicle and suction by the fan 126 creating a pressure differential between the fan 126 and both the inlet fan duct 122 and the heat exchanger inlet 102.

The gas turbine engine 100 may also be operated in the turboshaft mode when the vehicle is relatively stationary, such as hovering or otherwise not significantly moving forward or backward (e.g. not moving very fast). In the turboshaft mode, the inlet guide vanes 124 may be closed. During the turboshaft mode, the fluid flow of air F2 is received in the intake section 120 by entering the heat exchanger inlet 102, passing through the heat exchanger 104, and the supply passage 106 into the plenum 108 for introduction into the inlet fan duct 122 downstream of the inlet guide vanes 124. Since the inlet guide vanes 124 are closed, there is little or no fluid airflow F1, since it is obstructed by the closed inlet guide vanes 124. Fluid airflow F2 is created in the turboshaft mode by the pressure differential between fan 126 and the heat exchanger inlet 102. Accordingly fluid airflow F2 being provided to the fan 126 occurs in both the turbofan mode and the turboshaft mode.

The air flow received by the fan 126 is divided by a splitter 128 into a primary air flow 132 and bypass air flow 134. The bypass airflow 134 may flow in the housing 101 radially external to the compressor section 160, the combustion section 130, the turbine section 110, and the exhaust section 150. The primary airflow 132 may be compressed within the compressor section 160. The compressed air may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a shaft 118 of a turbine 114 to rotate, which in turn drives the compressor section 160. In the case of a vehicle such as a helicopter, the shaft 118 may also drive a rotor or other device or system external to the gas turbine engine 100. In other examples, the shaft 118 may drive an electrical generator, a fan prop, a propeller, or other system or device capable of using shaft horsepower in the form of rotational torque provided on the shaft 118. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn the shaft 118 such that the blades 112 may rotate around an axis of rotation, such as a central axis X of the turbine 114. In examples, such as the example illustrated in FIG. 2, the centerline of the turbine 114, the centerline of the gas turbine engine 100, and the centerline of the fan 126 are the same, and lie along the central axis X.

The heat exchanger 104 may operate within a thermal management system to perform a heat dissipation or cooling function in both the turbofan mode and the turboshaft mode. In an example of a vehicle such as an aircraft, the thermal management system may operate to remove excess heat from, for example, gearboxes and hydraulic accessories of a VTOL (Vertical Take-Off and Landing) aircraft, using powered blowers to draw air across a heat exchanger, such as the heat exchanger 104. The mechanically driven blowers draw power from the gas turbine engine(s) and reduce the useable shaft horsepower. With the configuration illustrated in FIG. 1, there is no need for such mechanically driven blowers in either the turbofan mode or turboshaft mode since the air is drawn across the heat exchanger(s) 104 using the pressure differential between the heat exchanger inlet 102 and the fan 126, which is downstream of the inlet guide vane (IGV) 124. The engine shown in FIG. 1 is a convertible configuration which means that it switches between a turbofan mode and a turboshaft mode. The inlet guide vane 124 is open during the turbofan mode which enables the fan 126 to produce the required thrust. During turboshaft mode, the IGV 124 is closed down to spoil the fan thrust and reduce the power absorbed by the fan. In both modes, there is an adequate pressure differential between the heat exchanger inlet 102 and the fan 126 to draw the air thru the heat exchanger 104.

Figure 2:
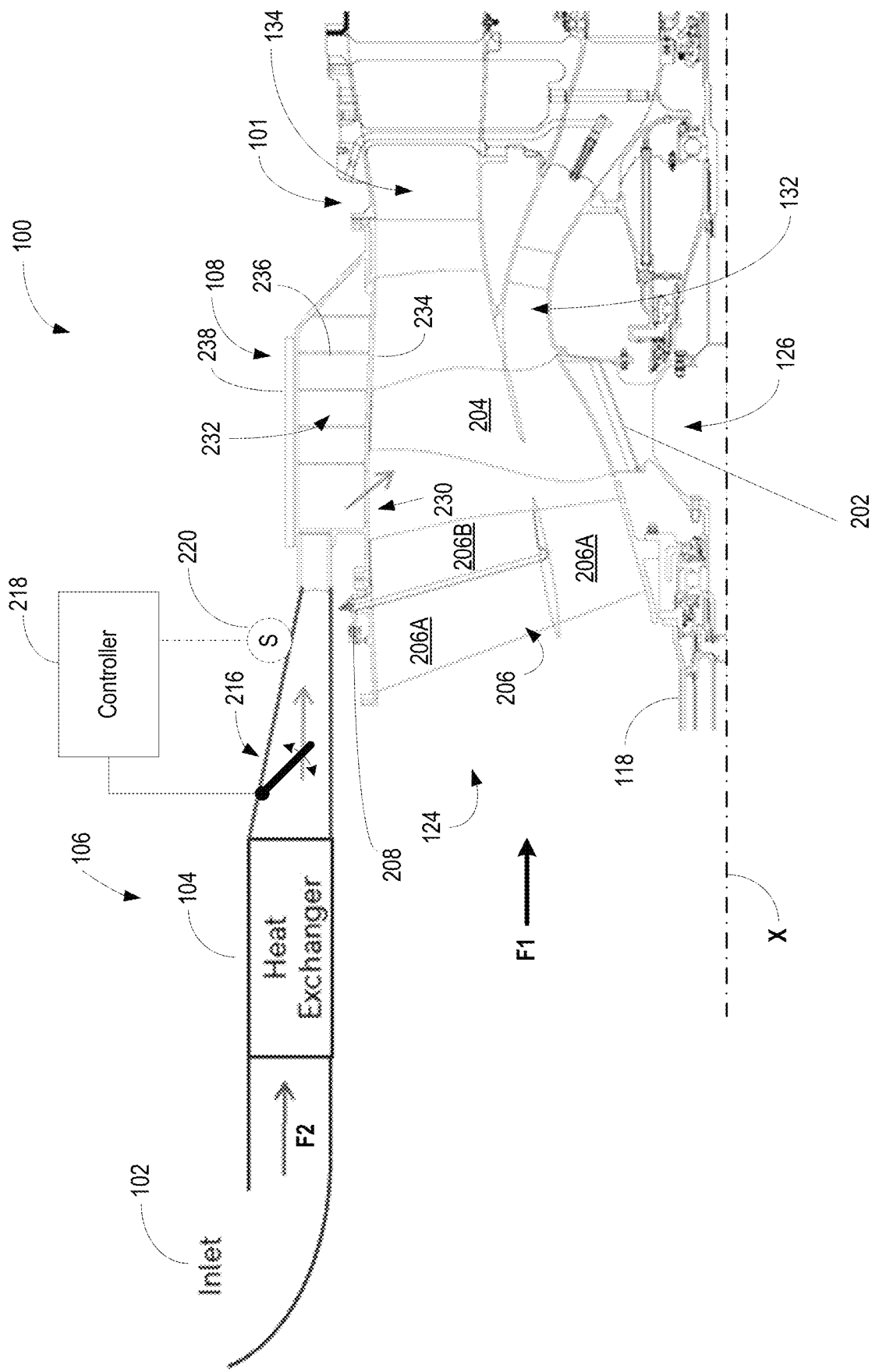
FIG. 2 is a cross sectional view of a portion of the gas turbine engine 100 illustrated in FIG. 1.

FIG. 2 is a cutaway side view of an example of a portion of the gas turbine engine 100 illustrated in FIG. 1. In FIG. 2, the housing 101 is concentric with the central axis X of the gas turbine engine 100. The fan 126 is disposed in the housing 101 to rotate coaxially with the gas turbine 114 (FIG. 1) included in the housing 101. The fan may include a fan hub 202 and blades 204.

The inlet guide vane 124 may be disposed in the housing 101 in axial alignment with the fan 120 and include one or more vanes 206 to control the flow of air (F1) through at least part of the inlet guide vane 124. The inlet guide vane 124 may be configured to move between an open position and a closed position using a positioner 208, such as a servo motor or hydraulic actuator, to adjust the positioning of one or more vanes 206. In some examples, multiple vanes 206 may be positioned differently with respect to each other to represent the open and closed position. In other examples, a single vane or portions of one or more vanes may be positioned differently to represent the open and closed positions. The condition where the vane(s) 206 are spaced apart, or otherwise positioned to permit at least some unconstricted air flow through the inlet guide vane 124, is referred to herein as the "open position." Conversely, the "closed position" occurs when at least a portion of the vane(s) 206 are spaced closely, or contiguously, or otherwise moved to a position so as to constrict at least some of the air flow, such that restricted airflow or substantially no air flow through at least part of the inlet guide vanes 124 occurs. It should be recognized that the open and closed positions are not necessarily a full air flow and a zero air flow condition, respectively, but rather represent an operational condition of the gas turbine engine as producing thrust with the fan and not producing thrust with the fan, respectively, as discussed.

In the example of FIG. 2, the illustrated vane 206 includes a stationary portion 206A and a moveable portion 206B. The positioner 208 may actuate the moveable portion 206B between the open position (turbofan mode) and the closed position (turbo shaft mode) to constrict the flow of air F1 to the portion of the fan 126 upstream of the bypass air duct 134. In the illustrated example, the stationary portion 206A operates as a fixed guide vane to channel the first flow of air F1. Accordingly, the flow of air F1 to the portion of the fan 126 upstream of the primary air duct 132 may remain un-constricted even when the moveable portion 206B is in the closed position. Thus, in this example, when the moveable portion 206B is in the closed position, the differential pressure between the inlet 102 and the fan 126 will be relatively high when compared to the differential pressure when the moveable portion 206B is in the open position, due to the suction of the fan 126 and the position of the moveable portion 206B (constricted vs. non-constricted flow of air F1). In either the open position or the closed position of the moveable portion 206B, the pressure differential between the heat exchanger inlet 102 and the fan 126 is sufficient to draw air thru the heat exchanger 104.

The heat exchanger 104 is disposed in the supply passage 106 in fluid communication with a flow of air (F2) received by the fan. The heat exchanger 104 may be any form of one or more systems, mechanisms or devices that provide transfer of heat energy between different fluids. Example heat exchangers include a plate fin heat exchanger, a tube bank heat exchanger, a plate heat exchanger, a micro/mini-channel heat exchanger, a printed circuit heat exchanger, a Marbond heat exchanger, and/or any other thermal transfer system or device. Heat exchanger 104 may thermally transfer heat energy to the flow of air F2 such that the temperature of the flow of air F2 prior to fluid communication with the heat exchanger 104 is lower than the temperature of the flow of air F2 upon leaving fluid communication with the heat exchanger 104. In an example, the heat exchanger 104 may be a plate type heat exchanger such that the flow of air F2 flows around at least a part of the plates of the heat exchanger 104. In this configuration, the heat exchanger 104 may be positioned perpendicular to the flow of air F2 and occupy a cross-sectional area in the supply passage 106 such that the flow of air F2 flows orthogonally through at least a portion of the heat exchanger 104. Alternatively, the heat exchanger 104 may be positioned obliquely in the supply passage 106 with respect to the flow of air F2.

The inlet 102 and the air supply passage 106, including the heat exchanger 104 may be external to the housing 101. The inlet 102 may be a NACA duct, a NACA scoop, a NACA inlet, or some other low drag air inlet design capable of efficiently received the flow of air F2. In the example of a vehicle, the inlet 102 may be mounted on or formed in an external surface of the vehicle that is subject to a consistently available supply of air, such as on a top or side wall outer surface of the vehicle. In some examples, the inlet 102 may include a mechanical cover, louvers, screen or other movable inhibitor to discourage entry of dust and/or debris into the supply passage 106. The fluid flow of air F2 in the supply passage 106 may enter the housing 101 through one or more apertures formed in the housing 101. In the turbofan mode, when the inlet guide vane 124 is in the open position, the inlet 102 may capture, draw, take in, or otherwise receive a flow of air F2 moving at a velocity according to, for example, a ram pressure due to movement of the vehicle, with lesser reliance on the differential pressure between the inlet 102 and the fan 126 for air flow through the heat exchanger 104 to the fan 126. For example, where the inlet 102 is a NACA duct, the flow of air F2 may be induced to enter the inlet 102 by the NACA duct configuration, which may draw in relatively fast flowing air by ram pressure due to movement of the vehicle. In the turbo shaft mode, when the inlet guide vane 124 is in the closed position, the flow of air F2 at the inlet 102 may be induced mainly by the differential pressure between the inlet 102 and the fan 126 for air flow through the heat exchanger 104 to the fan 126.

In an example of a vehicle, such as an aircraft, where substantially the same air flow through the supply passage 106 and heat exchanger 104 is desired when the vehicle is moving, such as in forward flight, and when the vehicle is not substantially moving, such as when hovering, the differential pressure between the inlet 102 and the fan 126 should similarly be substantially the same. In this example, in forward flight, the total pressure is increased at the inlet 102 (due to ram effects). Therefore, the pressure at slots 230 positioned near the fan 126 may be higher and still achieve the desired substantially similar differential pressure. When the vehicle of this example is hovering, however, the pressure at the inlet 102 is ambient air pressure. Therefore, to generate a substantially similar differential pressure between the inlet 102 and the fan 126 through the heat exchanger 104, the pressure at the slots 230 should be lower by actuating damper 206B to the closed position to restrict the flow of air into the fan bypass air duct 134. With the actuating damper 206B in the closed position, the operation of the fan 126 lowers the pressure at slots 230 and the similar differential pressure is achieved between the inlet 102 and the fan 126.

The supply passage 106 may also include a damper 216. The damper 216 may be modulated between a fully open position and a fully closed position to control the flow of air F2 received by the fan 126. Flow control of the damper 216 may be manual or automated. The damper 216 may be a plate, a series of vanes, a gate, louvers, a guillotine, or some other air flow modulating and control system capable of restricting the fluid flow of air F2 through the heat exchanger 104 to the fan 126. In an example, the damper 216 may be, or may include, an inflatable/deflatable bladder due to the internal shape or dimensions of the supply passage 106, as illustrated by dotted lines in FIGS. 3A and 3B. Thus, in this example, the bladders may be deflated, as illustrated in FIG. 3A, to maximize the volume of the fluid flow of air F2 being drawn through the supply passage 106 by the fan 126. As the bladder is inflated, the cross-sectional area of the supply passage 106 not being blocked by the bladder may decrease, or become progressively smaller, thereby reducing the fluid flow of air F2.

When automated, the damper 216 may be actuated by, for example, an electrical actuator, a hydraulic actuator, a pneumatic actuator or some combination of actuators. In other examples, some other actuator or actuators, or combination of actuators may be used. Operation of the damper 216 may be controlled by a controller 218. The controller 218 may be circuitry and logic configured to perform feedback or feed-forward control, for example, to manage the flow of air F2. In an example, the controller 218 may control the damper 216 based on a sensor (S) 220, such as a pressure or temperature sensor monitoring a variable parameter of the supply passage 106. In addition, or alternatively, sensor 220 may also sense the temperature of the fluid that is being cooled in heat exchanger 104, in order to provide the proper amount of cooling in the heat exchanger 104. In other examples, other forms of feedback or feedforward may be used to control the fluid flow of air F2. In addition or alternatively, in examples the sensor 220 may be omitted, and the control of the damper 216 may be based on other variable parameters of the gas turbine engine 100 or a vehicle or system in which the gas turbine engine 100 operates.

The fluid flow of air F2 through the supply passage 106 and the heat exchanger 104 is induced by a differential pressure between the inlet 102 and the rotating fan 126. The rotation of the fan 126 creates a suction thereby dropping the pressure in the housing 101 upstream of the fan 126 relative to ambient pressure at the inlet 102. Accordingly air may be drawn into the supply passage 106, through the heat exchanger 104 and into the housing 101. In examples, the supply passage 106 may supply the air to the fan via the plenum 108. In other examples, the plenum 108 may be omitted or replaced by and the fluid flow of air F2 may be provided into the housing 101 directly by the supply passage 106, or by another structure.

In FIG. 2, the plenum 108 at least partially surrounds a part of the housing 101 and is in fluid communication with the fan 126 via slots 230 formed in the housing 101 to provide fluid communication between the housing 101 and the plenum 108. The slots 230 may have a predetermined geometry to control circumferentially distribution of the flow of air to the fan 126. The supply passage 106 is also in fluid communication with the plenum such that the flow of air F2 is circumferentially supplied to the fan 126 by the plenum 108.

In examples, in addition to providing a flow path for the flow air F2 to the fan 126, the plenum 108 also provides a cavity in the form of a containment zone 232 for blade off events. Thus, the plenum 108 is a blade containment cavity 232 concentrically surrounding a part of the housing 101 and configured to capture a fan blade 204 separated from the fan 126 during rotation. In this configuration, the slots 230 may be formed in a fan track liner 234 that is positioned radially outward from the fan 126. The fan track liner 234 may include an abradable surface to withstand inadvertent rubbing of tips of the fan blades 204, due to, for example, thermal contraction and expansion. In addition, the fan track liner 234 may be designed as a mechanical fuse to give way or otherwise mechanically separate during a fan blade off event. Although rare, a fan blade off event can occur, for example due to a foreign body, such as a bird, striking a fan blade and resulting in at least part of a fan blade becoming detached. In this situation, the fan track liner 234 may mechanically separate to allow the projectile fan blade to enter and be captured in the containment zone 232. The containment zone 232 may include supports 236. In some examples, the supports 236 may be in the form of plates, columns, struts or other structural members. In addition to the supports 236 maintaining the integrity of the containment area 232 during such a fan blade off event, the plenum 108 may also include a shield material 238, such as Kevlar or titanium to withstand the high energies caused by an impact of the detached portion of a fan blade within the containment zone 232.

The flow of air F2 entering the plenum 108 may flow into the housing 101 through the slots 230. Prior to flowing through the slots 230, at least some of the flow of air F2 may flow through apertures included in the supports 236 in order to flow circumferentially around the housing 101 before flowing through apertures in the supports 236 and through the slots 230. Since the plenum 108 includes an internal cavity, the supports 236 may allow the flow of air. For example, where the supports 236 are a plurality of plates, the plates may be perforated with apertures and disposed in the cavity to extended radially outward away from an outer surface of the housing 101 and provide fluid channels to distribute the flow of air F2 throughout the cavity to the slots 230. Alternatively, or in addition, in other examples, columns, and/or other rigid structural members may be positioned and formed in the internal cavity to direct, or otherwise manage and/or allow, the flow of air in predetermined flow paths through the housing 101.

Upon flowing through the slots 230, the flow of air F2 may enter the housing 101 between the inlet guide vanes 124 and the fan 126. The characteristics of the flow and the volume of the flow of air F2 may be controlled with the geometry of the slots. For example, the volume of the flow of air F2 through the different slots 230 around the circumference of the housing 101 may be uniform based on use of varying geometry of the slots 230. In another example, the geometry of the slots 230 may be configured to achieve uniform flow characteristics, such as uniform laminar flow of the air flow F2 entering the housing 101. In still another example, the direction of the flow of air F2 may be managed with the geometry of the slots 230 to, for example, direct the flow of air F2 exiting slots 230 into the bypass air 134 instead of into the primary air 132.

Since the flow of air F1 (or first flow of air) to the fan 126 is through the inlet guide vanes 124, and the flow of air F2 (or second flow of air) to the fan 126 is through the supply passage 106, the first flow of air F1 and the second flow of air F2 are separately and independently supplied to the fan 126. Thus, the positon of the inlet guide vanes 124 as being opened or closed has significant effect on constriction of the flow of air F1 being supplied to the fan 126, and yet does not constrict the flow of air F2 reaching the fan 126. Accordingly, the flow of air F2 is received by the fan 126 via the supply passage 106 with the inlet guide vane 124 in the open position or in the closed position. As discussed elsewhere, the open position of the inlet guide vanes represents a turbofan mode of operation of the gas turbine engine in which the gas turbine engine provides thrust, and the closed position of the inlet guide vanes represents a turboshaft mode of operation in which the gas turbine engine does not provide thrust.

FIG. 3 includes block diagrams 3A and 3B of an example configuration of gas turbine engines. In FIG. 3, a first gas turbine engine 100A and a second gas turbine engine 100B are depicted in an example configuration. The first and second gas turbine engines 100A and 100B may be configured, arranged and controlled to operate in, for example, a dual engine application, such as in a vehicle, which may include, for example, helicopters or other aircraft. In other examples, additional gas turbine engines may be included in the configuration.

The first gas turbine engine 100A includes a housing 101A, a heat exchanger 104A and a supply passage 106A having a damper 216A. In some examples, the first gas turbine engine 100A may also include a plenum 108A extending circumferentially around the outside of the housing 101A. The second gas turbine engine 100B includes a housing 101B, a heat exchanger 104B and a supply passage 106B having a damper 216B. In some examples, the second gas turbine engine 100B may also include a plenum 108B extending circumferentially around the outside of the housing 101B. Similar to the previous discussed examples, each of the gas turbine engines 100A and 100B include a fan 126 (FIG. 2) and have the capability to supply a flow air F2 via the respective supply passages 106A and 106B to the fan. In addition, each of the gas turbine engines 100A and 100B may have the capability to separately and independently draw air through the respective supply passage 106 A and 106B and respective heat exchanger 104A and 104B to the fan. A cross-over duct 302 provides fluid communication between the supply passage 106A and the crossover duct 106B. The functions and features discussed herein with respect to FIGS. 1 and 2 are applicable and useable in the examples of FIG. 3, unless specifically indicated otherwise. Accordingly, for purposes of brevity, these discussions will not be repeated. Also, the terms "first", "second", "third", etc., and "A," "B," etc. are used herein for understanding by the reader and should not be construed as an order or priority or any other form of limitation of the systems, devices and functionality described. In addition, in other examples, different ordering or nomenclature could be used to describe the respective systems, devices and functionality and letters and numerical terms may be used interchangeably, such that, for example, "A" could be described as "first".

In FIG. 3A, a first example operation is depicted in which gas turbine engines 100A and 100B are both operational and respective flow of air F2A and F2B is being respectively supplied to the respective fans of the first gas turbine engine 100A and the second gas turbine engine 100B. Respective flow of air F2A and F2B may be respectively supplied to the respective fans through respective heat exchangers 104A and 104B without restriction/constriction due to the respective dampers (and/or bladders) 216A and 216B being open in the respective air passageways 106A and 106B. In addition, another independent flow of air may be supplied to the respective fans through the respective inlet guide vanes 124 (FIG. 2), if the inlet guide vanes are in the open position, as previously discussed. In other examples, additional gas turbine engines may be included with cross over ducts in fluid communication with cross over duct 302, or operational with a separate cross over duct, or operational with multiple cross over ducts, include cross over duct 302.

The cross over duct 302 may be positioned anywhere along the respective supply passages 106A and 106B so long as air flowing in the respective supply passages 106A and 106B flow through the respective heat exchangers 104A and 104B before reaching the cross over duct 302. In this way, the respective heat exchangers 104A and 104B still provide respective cooling regardless of the absence or presence of air flow through the cross over duct 302. Thus, the cross over duct 302 may be positioned and configured to provide an open and unconstricted flow path between the respective supply passages 106A and 106B downstream of the respective heat exchangers 104A and 104B.

In other examples, a damper, or some other flow regulation system may be included in the cross over duct 302 to control air flow therethrough. During operation, air flow through the cross over duct 302 between the supply passages 106A and 106B may be minimal due to the respective draw from the respective fans in the respective gas turbine engines 100A and 100B being about equal, or only different by a relatively small amount. Thus, each of the respective fans may independently draw the respective flow of air F2A and F2B through respective inlets 102A and 102B, through respective heat exchanges 104A and 104B, and through respective plenums 108A and 108B (when present). Respective heat exchanges 104A and 104B, may convect or otherwise impart thermal energy into the respective flow of air F2A and F2B.

FIG. 3B is a second example operation depicting operation where gas turbine engine A is inoperative and gas turbine engine B is operative. This may be referred to as a one engine inoperative (OEI) scenario in the case of a vehicle such as a helicopter or other aircraft. In other operational scenarios, gas turbine engine B may be inoperative and gas turbine engine A may be operative. Further, additional gas turbine engines may be include in an operative or inoperative state in different example scenarios.

During operating in the illustrated example scenario of FIG. 3B, dampers 216A and 216B (and/or bladders) which may also be described as flow control valves (A and B), or first and second dampers A and B, may cooperatively operate in conjunction with the cross-over duct 302 to direct the flow of air F2. If gas turbine engine A 100 becomes inoperative, as illustrated in FIG. 3B, damper 216A may be closed (and/or the bladder inflated) in order to direct the flow of air F2A through the heat exchanger 104A and the cross over duct 302 into supply passage 106B. Thus, closing 216A prevents gas turbine engine 100B from drawing air through the inoperative gas turbine engine 100A. If air is drawn through inoperative gas turbine engine 100A, then less air will be drawn through the heat exchangers 104A and 104B, thereby potentially limiting the ability of both heat exchangers 104A and 104B to reject heat. Since the fan of operative gas turbine engine 100B is creating a differential pressure, both flow of air F2A, which passes through heat exchanger 104A, is supplied through cross over duct 302 and flow of air F2B is drawn through supply passage 106B, open damper (and/or bladder) 216B, heat exchanger 104B, optional plenum 108B and into the housing of operating gas turbine engine 100B.

Figure 4:
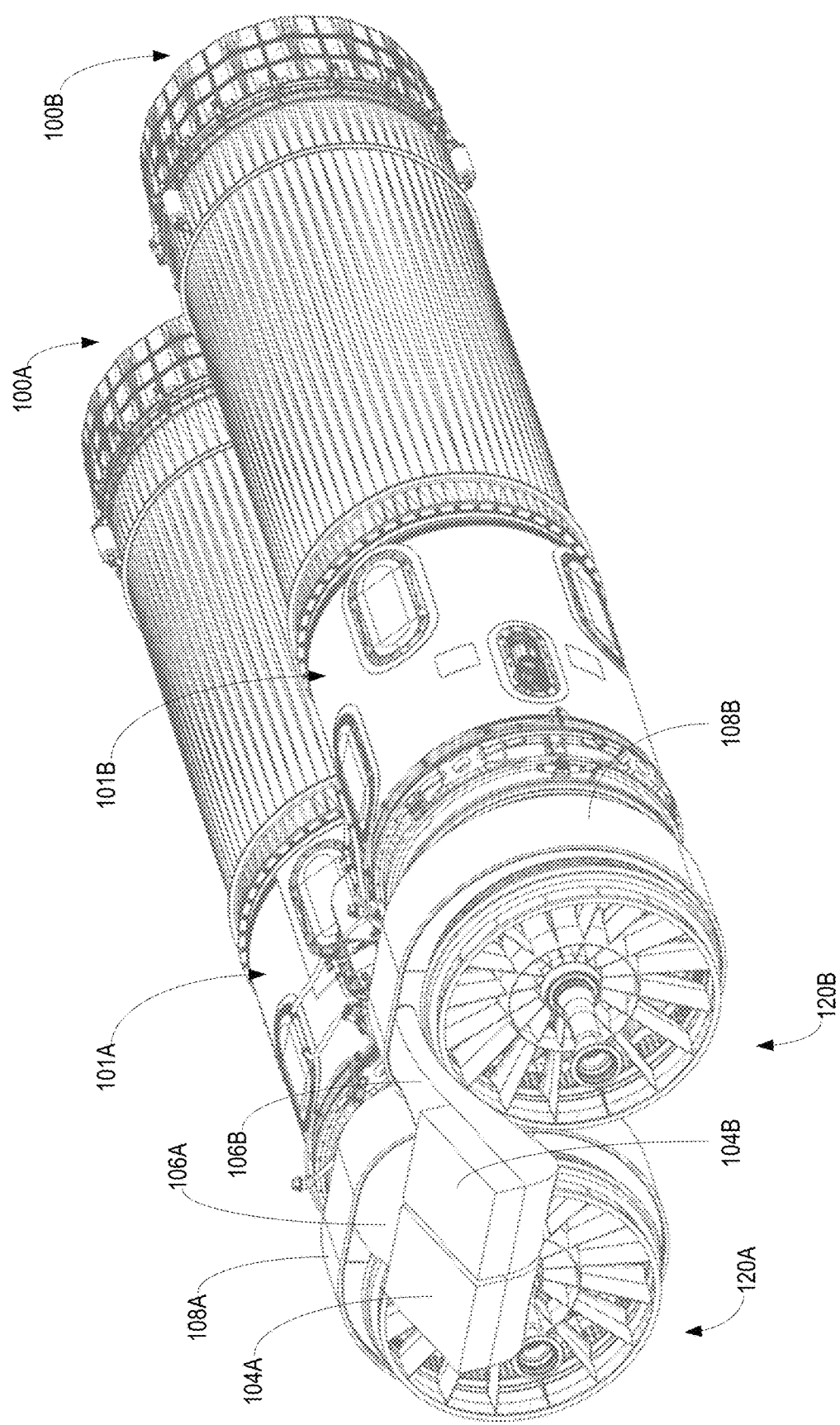
FIG. 4 is a perspective view of an example configuration of gas turbine engines.
Figure 5:
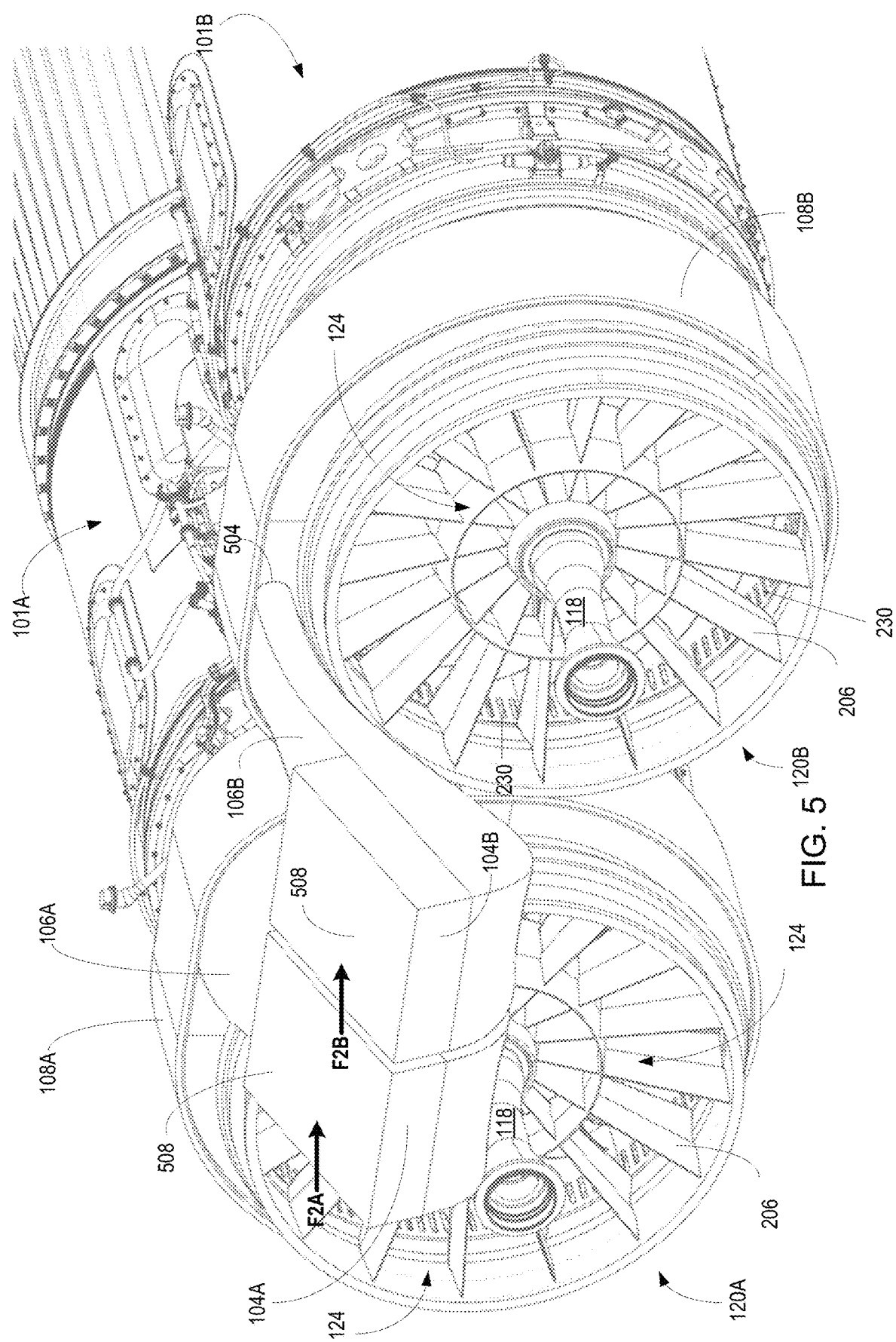
FIG. 5 is a perspective view of a portion of the example configuration of gas turbine engines illustrated in FIG. 4.

FIG. 4 is a perspective view of an example configuration of gas turbine engines. FIG. 5 is a perspective view of a portion of the example configuration of gas turbine engines illustrated in FIG. 4. In FIGS. 4 and 5, an example of a first gas turbine engine 100A and an example of a second gas turbine engine 100B are illustrated in an example configuration. The first and second gas turbine engines 100A and 100B may be configured, arranged and controlled to operate in, for example, a dual engine application, such as in a vehicle, which may include, for example, helicopters or other aircraft. In other examples, additional gas turbine engines may be included in the configuration.

As shown in FIG. 4, the first and second gas turbine engines 100A and 100B each include respective housings 101A and 101B, with an intake section 120A and 120B and an exhaust section 150A and 150B. Referring to FIGS. 4 and 5, first and second heat exchangers 104A and 104B, first and second air passages 106A and 106B, and first and second plenums 108A and 108B are also illustrated. The first and second inlets 102A and 102B and a portion of the air passages 106A and 106B have been omitted for clarity.

The functions and features discussed herein with respect to FIGS. 1-3 are applicable and useable in the examples of FIGS. 4 and 5, unless specifically indicated otherwise. Accordingly, for purposes of brevity, these discussions will not be repeated. Also, the terms "first", "second", "third", etc., and "A," "B," etc. are used herein for understanding by the reader and should not be construed as an order or priority or any other form of limitation of the systems, devices and functionality described. In addition, in other examples, different ordering or nomenclature could be used to describe the respective systems, devices and functionality and letters and numerical terms may be used interchangeably, such that, for example, "A" could be described as "first".

As best illustrated in FIG. 5, the vanes 206 included in the inlet guide vanes 124 extend radially outward from the shaft 118. Upstream of the fan 126 (FIG. 2), and downstream of the inlet guide vane 124 are the slots 230. In the illustrated example, the slots 230 are arranged concentrically in the housing 101 to provide fluid communication between the plenum 108 and the housing 101. As discussed herein, the geometry of the slots 230 are predetermined to obtain desired flow rate, direction, linearity and uniformity of the air flow F2A and F2B from the respective plenums 108A and 108B or respective air passages 106A and 106B into the housing 101 via the slots 230. The geometry of the plenum 108 may also be predetermined to obtain desired volume, direction, linearity and uniformity of the air flow F2A and F2B circumferentially around the respective housing 101A and 101B and through the slots 230. In the illustrated example, the volume of the containment zone in the plenum 108 becomes progressively smaller as the plenum 108 extends radially away from a coupling point 504 where the flow passage 106 and the plenum 108 are coupled.

The heat exchangers 104A and 104B are positioned in the respective supply passages 106A and 106B. Each of the supply passages 106A and 106B may include a first section downstream of the respective heat exchangers 104A and 104B, and a second section, that includes the inlet 102, upstream of the respective heat exchangers 104A and 104B, with the heat exchangers 104A and 104B being a third middle section between the first and second sections. The second section of the respective heat exchangers 104A and 104B is not illustrated in FIG. 5 in order to illustrate that the respective heat exchangers 104A and 104B are obliquely positioned in the respective supply passages 106A and 106B with respect to an angle of incidence of the flow of air F2 on a front planar surface 508 of the respective heat exchangers 104A and 104B. In addition to providing a favorable profile for maximizing thermal transfer while minimizing pressure loss, the oblique positioning of the heat exchangers 104A and 104B may also reduce an outer envelope, or cross sectional area of the supply passages 106A and 106B in the third section. Thus, the overall footprint, or space accommodation needed for the supply passages 106A and 104B may be smaller than would be used if the angle of incidence was orthogonal, for example.

Figure 6:
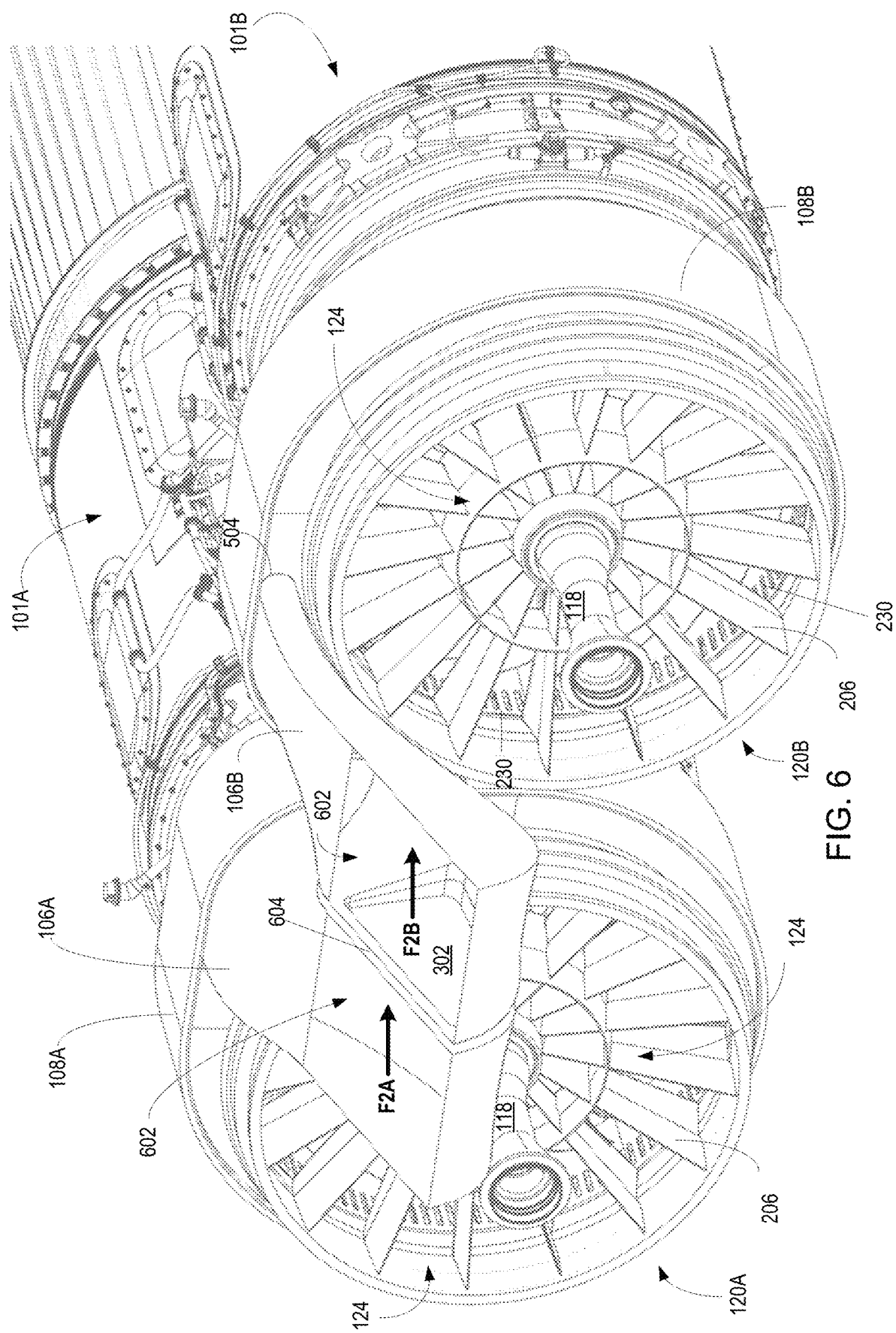
FIG. 6 is a perspective view of a portion of the example configuration of gas turbine engines illustrated in FIGS. 4 and 5.

FIG. 6 is a perspective view of a portion of the example configuration of gas turbine engines illustrated in FIGS. 4 and 5. In FIG. 6, the heat exchangers 104A and 104B are removed from the respective supply passages 106A and 106B. Each of the respective supply passages 106A and 106 B include a downstream cavity 602, which receives the heated flow of air F2A and F2B exiting the respective heat exchangers 104A and 104B. The heated flow of air F2A and F2B (post heat exchanger 104A and 104B) may flow through the second section of the respective supply passages 106A and 106B toward the respective fans included in each of the gas turbine engines 100A and 100B.

A divider 604 may provide structural support to maintain the position of the respective heat exchangers 104A and 104B in the respective supply passages 106A and 106B. The divider 604 may be formed to include the cross-over duct 302. In the illustrated example, the cross-over duct 302 is an aperture or open duct formed to extend orthogonally between the first and second supply passages 106A and 106B. Since the flow of air F2A and F2B are being drawn by the differential pressure created by the respective fans in the respective gas turbine engines 100A and 100B, there is little cross over flow of air through the cross-over duct 302 until one of the gas turbine engines 100A or 100B become inoperative. The dampers 216 FIG. 3 may be included in the second section of the respective supply passages 106A and 106B.

The flow of air F2A and F2B may be into the respective housings 101A and 101B via respective supply passages 106A and 106B. In the illustrated example, the flow of air F2A and F2B is distributed circumferentially around the respective housings 101A and 101B by respective plenums 108A and 108B. In other examples, the plenums 108A and 108B may be omitted such as when the respective supply passages 106A and 106B provide circumferential distribution of the respective flow of air F2A and F2B to the respective slots 230, or passageways within the respective housings 101A and 101B provide the circumferential distribution to the slots 230. Features within the respective plenums 108A and 108B may adjust characteristics of the flow of air F2A and F2B. Such characteristics may include a level of turbulence, non-laminar flow, non-uniform trajectory of the flow of air and/or a volume, pressure and or rate of flow of the respective air F2A and F2B.

Figure 7:
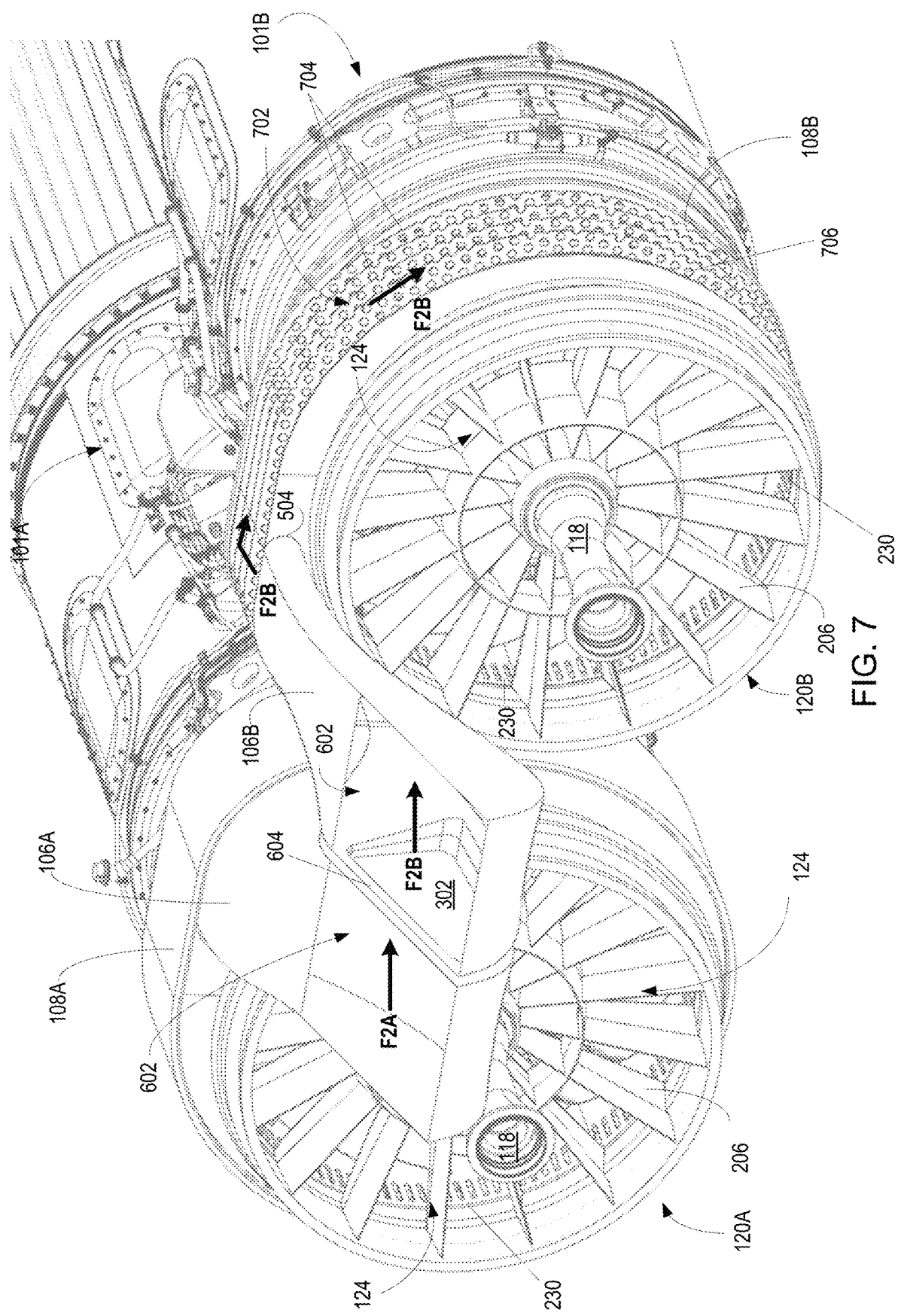
FIG. 7 is a perspective view of a portion of the example configuration of gas turbine engines illustrated in FIGS. 4 and 5 and 6.

FIG. 7 is a perspective view of a portion of the example configuration of gas turbine engines illustrated in FIGS. 4 and 5 and 6. In FIG. 7, in addition to omission of the respective first sections of the supply passages 106A and 106B that include the respective inlets 102A and 102B and the respective heat exchangers 104A and 104B, an outer wall of the plenum 108B, which is positioned radially outward from housing 101B is also omitted for purposes of explanation. The respective plenums 108A and 108B may include a cavity 702 through which the flow of air F2A and F2B are channeled. In addition, the cavity 702 may provide at least part of a containment zone 232 for blade off events.

Within the cavity 702, there may be one or more supports 704. The supports 704 may be structural supports, such as plates, columns, and/or other structural members to not only rigidly position the omitted outer wall of the plenum 108B, but also provide blade containment retention in blade off events. In addition, the supports 704 may provide flow channels to direct and manage the flow of air F2B circumferentially around the housing 101B. In the illustrated example, there are a number of rows of supports 704 in the form of plates, each of which may include apertures 706 providing flow paths. In addition, or alternatively, columns and/or any other structural members forming the supports 704 may also direct and manage the flow of air F2B and create such flow paths. In this configuration, the flow of air F2B being drawn into the plenum 108B from the supply passage 106B may disperse such that some portion of the flow of air F2B may enter the housing 101B via the slots 230. Other portions of the flow of air F2B may flow through other flow paths, such as the apertures 706 in the perforated plates, and flow circumferentially around the housing 101B in the cavity to enter through other slots 230 as illustrated by arrows F2B.

Using this system, air flow induced by the fan to be drawn through the heat exchanger positioned in the inlet section may reduce or eliminate use of mechanical blowers to generate such air flow. Accordingly, significant horsepower savings/efficiency may be realized. In addition, with the system provided herein, air flow may be drawn through the heat exchanger during operation in a dual mode system that transitions between a turbo fan mode and a turboshaft mode where inlet guide vanes are open and closed, due to the air flow drawn through the heat exchanger being separate and independent of the air flow being constricted, or not constricted, by the inlet guide vanes. In dual engine systems, such as in an aircraft, where there are multiple engines respective heat exchangers may be supplied a flow of air for cooling. Upon one of the engines in such a dual engine system becoming inoperative, the flow of air to the fan of the inoperative engine may be re-directed to another fan of an operative engine such that the heat exchanger associated with an inoperative engine may still provide cooling. In addition, the supply passage 106 of the inoperative gas turbine engine is blocked so that air is not sucked from the inoperative engine.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

Aspect 1. A system comprising: a housing for a gas turbine engine; a fan disposed in the housing to rotate coaxially with a gas turbine included in the housing; an inlet guide vane disposed in the housing in axial alignment with the fan and configured to have an open position where a first flow of air is received by the fan through the inlet guide vane, and a closed position where airflow through the inlet guide vane is obstructed; and a heat exchanger disposed in a supply passage in fluid communication with a second flow of air received by the fan, the second flow of air received by the fan via the supply passage with the inlet guide vane in the open position or in the closed position.

Aspect 2. The system of aspect 1, wherein the second flow of air through the supply passage is induced by a differential pressure between an inlet of the supply passage and the fan, the differential pressure created by rotation of the fan.

Aspect 3. The system of aspect 1 or aspect 2, further comprising a plenum at least partially surrounding a part of the housing and in fluid communication with the fan, the supply passage also in fluid communication with the plenum such that the second flow of air is circumferentially supplied to the fan by the plenum.

Aspect 4. The system of aspect 3, wherein the plenum is in fluid communication with the fan via a plurality of slots formed in the housing, the slots having a predetermined geometry to circumferentially distribute the second flow of air to the fan.

Aspect 5. The system of aspect 4, wherein the plenum includes an internal cavity, a plurality of perforated plates disposed in the internal cavity to extended radially outward away from an outer surface of the housing and provide fluid channels to distribute the second flow of air throughout the internal cavity to the slots.

Aspect 6. The system of aspect 3, wherein the plenum is a blade containment cavity concentrically surrounding a part of the housing and configured to capture a fan blade separated from the fan during rotation of the fan.

Aspect 7. The system of any of aspects 1-6, wherein the open position of the inlet guide vane represents a turbofan mode of operation of the gas turbine engine in which the gas turbine engine provides thrust, and the closed position of the inlet guide vane represents a turboshaft mode of operation in which the gas turbine engine does not provide thrust.

Aspect 8. The system of any of aspects 1-7, wherein the first flow of air and the second flow of air are separately and independently supplied to the fan.

Aspect 9. A method comprising: rotating, with a gas turbine engine, a fan included in a housing of the gas turbine engine; drawing a second flow of air into the housing to supply the fan through a heat exchanger disposed in a supply passage based on a pressure differential between the fan and an inlet to the supply passage; operating an inlet guide vane included in the housing in an open position to supply, through the inlet guide vane, a first flow of air to the fan, the first flow of air being supplied to the fan separate from and in addition to the second flow of air supplied to the fan; and operating the inlet guide vane in a closed position to restrict supply of the first flow of air to the fan, but not restrict supply of the second flow of air to the fan through the heat exchanger disposed in the supply passage.

Aspect 10. The method of aspect 9, wherein drawing the second flow of air through the heat exchanger disposed in the supply passage further comprises circumferentially distributing the second flow of air within the housing with a plenum, the plenum surrounding at least a portion of the housing and coupled with the supply passage.

Aspect 11. The method of aspect 10, wherein circumferentially distributing the second flow of air within the housing with the plenum comprises controlling characteristics of a flow and a volume of the second flow of air into the housing with a plurality of slots distributed radially in the housing with a predetermined geometric configuration.

Aspect 12. The method of any of aspects 9-11, wherein drawing the second flow of air through the heat exchanger disposed in the supply passage further comprises supplying the second flow of air into the housing between the inlet guide vane and the fan.

Aspect 13. The method of any of aspects 9-12, wherein operating the inlet guide vane included in the housing in an open position to supply, through the inlet guide vane, the first flow of air to the fan comprises supplying the first flow of air to the fan substantially axially with a central axis of the fan, and drawing the second flow of air through the heat exchanger disposed in the supply passage comprises training and directing the second flow of air into the housing to eliminate swirl.

Aspect 14. The method of any of aspects 9-13, further comprising controlling a damper in the supply passage to adjust the second flow of air.

Aspect 15 A system comprising: a plurality of heat exchangers disposed in a respective plurality of supply passages in fluid communication with a second flow of air received in respective inlets of the respective plurality of supply passages; a plurality of respective fans included in a respective plurality of gas turbine engines, each of the respective fans in fluid communication with a respective one of the supply passages, each of the respective fans rotatable to create a pressure differential between the respective fans and respective inlets of the respective plurality of supply passages to induce the second flow of air to the respective fans; and a plurality of inlet guide vanes included in each of the respective gas turbine engines, the inlet guide vanes configured to actuate between an open position to supply a first flow of air to the respective fans, and a closed position to restrict supply of the first flow of air to the respective fans, wherein the second flow of air is independent of the first flow of air such that the second flow of air is supplied from the respective plurality of supply passages to the respective fans while the inlet guide vanes are in the open position or the closed position.

Aspect 16. The system of aspect 15, wherein the plurality of gas turbine engines are configured, arranged and controlled to operate in a dual engine application.

Aspect 17. The system of aspect 15 or aspect 16, wherein the respective plurality of supply passages are in fluid communication with a plurality of respective plenums, each of the respective plenums extending concentrically around a housing of each of the respective gas turbine engines to distribute the second flow of air concentrically into the housing.

Aspect 18. The system as in any of aspects 15-17, where at least two of the supply passages are in fluid communication via a cross over duct, wherein the second flow of air is drawn from one of the respective supply passages through the cross over duct into another of the respective supply passages in response to one of the gas turbine engines becoming inoperative.

Aspect 19. The system of aspect 18, wherein the one of the respective supply passages includes a damper and the one of the respective supply passages supplies the one of the gas turbine engines, and the system further comprises a controller configured to close the damper in the one of the respective supply passages in response to the one of the gas turbine engines becoming inoperative.

Aspect 20. The system of aspect 19, wherein the damper comprises an inflatable bladder, and the controller is configured to direct inflation of the inflatable bladder to close off the one of the respective supply passages in response to the one of the gas turbine engines becoming inoperative.

In addition to the features mentioned in each of the independent aspects enumerated above, some examples may show, alone or in combination, the optional features mentioned in the dependent aspects and/or as disclosed in the description above and shown in the figures.

We claim:

1. A system comprising:
   a housing for a gas turbine engine;
   a fan disposed in the housing to rotate coaxially with a gas turbine included in the housing;
   an inlet guide vane disposed in the housing in axial alignment with the fan and configured to have an open position where a first flow of air is received by the fan through the inlet guide vane, and a closed position where airflow through the inlet guide vane is obstructed;
   a heat exchanger disposed in a supply passage in fluid communication with a second flow of air received by the fan;
   a plenum at least partially surrounding a part of the housing and the fan, the plenum in fluid communication with the fan, the supply passage also in fluid communication with the plenum such that the second flow of air is received by the fan via the supply passage and the plenum with the inlet guide vane in the open position and in the closed position.

2. The system of claim 1, wherein the second flow of air through the supply passage is induced by a differential pressure between an inlet of the supply passage and the fan, the differential pressure created by rotation of the fan.

3. The system of claim 1, wherein the plenum is in fluid communication with the fan via a plurality of slots formed in the housing between the plenum and the fan, the slots having a predetermined geometry to circumferentially distribute the second flow of air to the fan.

4. The system of claim 3, wherein the plenum includes an internal cavity, a plurality of perforated plates disposed in the internal cavity to extend radially outward away from an outer surface of the housing and provide fluid channels to distribute the second flow of air throughout the internal cavity to the slots.

5. The system of claim 1, wherein the plenum is a blade containment cavity concentrically surrounding a part of the housing and configured to capture a fan blade separated from the fan during rotation of the fan.

6. The system of claim 1, wherein the open position of the inlet guide vane represents a turbofan mode of operation of the gas turbine engine in which the gas turbine engine provides thrust, and the closed position of the inlet guide vane represents a turboshaft mode of operation in which the gas turbine engine does not provide thrust.

7. The system of claim 1, wherein the first flow of air and the second flow of air are separately and independently supplied to the fan.

8. The system of claim 1, wherein the plenum comprises an internal cavity extending along the housing from upstream of the fan to downstream of the fan.

9. The system of claim 8, wherein the internal cavity includes supports having apertures to distribute the second flow of air received by the fan through the housing from the plenum.

10. A method comprising:
    rotating, with a gas turbine engine, a fan included in a housing of the gas turbine engine;
    drawing a second flow of air into the housing to supply the fan through a plenum at least partially surrounding the housing and the fan;
    supplying the plenum with the second flow of air via a heat exchanger disposed in a supply passage by drawing the second flow of air into the housing through the plenum based on a pressure differential between the fan and an inlet to the supply passage;
    operating an inlet guide vane included in the housing in an open position to supply, through the inlet guide vane, a first flow of air to the fan, the first flow of air being supplied to the fan separate from and in addition to the second flow of air supplied to the fan; and
    operating the inlet guide vane in a closed position to restrict supply of the first flow of air to the fan, but not restrict supply of the second flow of air to the fan through the heat exchanger disposed in the supply passage.

11. The method of claim 10, wherein drawing the second flow of air through the plenum and the heat exchanger disposed in the supply passage further comprises circumferentially distributing the second flow of air within the housing with the plenum, the plenum surrounding at least a portion of the housing and coupled with the supply passage.

12. The method of claim 11, wherein circumferentially distributing the second flow of air within the housing with the plenum comprises controlling characteristics of a flow and a volume of the second flow of air into the housing with a plurality of slots distributed radially in the housing between the plenum and the fan, the slots having a predetermined geometric configuration.

13. The method of claim 10, wherein drawing the second flow of air through the plenum and the heat exchanger disposed in the supply passage further comprises supplying the second flow of air into the housing between the inlet guide vane and the fan.

14. The method of claim 10, wherein operating the inlet guide vane included in the housing in an open position to supply, through the inlet guide vane, the first flow of air to the fan comprises supplying the first flow of air to the fan substantially axially with a central axis of the fan, and drawing the second flow of air through the heat exchanger disposed in the supply passage comprises training and directing the second flow of air into the housing to eliminate swirl.

15. The method of claim 10, further comprising controlling a damper in the supply passage to adjust the second flow of air.

16. A system comprising:
   a plurality of heat exchangers disposed in a respective plurality of supply passages in fluid communication with a second flow of air received in respective inlets of the respective plurality of supply passages;
   a plurality of respective fans included in a respective plurality of gas turbine engines, each of the respective fans in fluid communication with a respective one of the supply passages, each of the respective fans rotatable to create a pressure differential between the respective fans and respective inlets of the respective plurality of supply passages to induce the second flow of air to the respective fans; and
   a plurality of inlet guide vanes included in each of the respective gas turbine engines, the inlet guide vanes configured to actuate between an open position to supply a first flow of air to the respective fans, and a closed position to restrict supply of the first flow of air to the respective fans, wherein the second flow of air is independent of the first flow of air such that the second flow of air is supplied from the respective plurality of supply passages to the respective fans while the inlet guide vanes are in the open position and the closed position,
   wherein at least two of the supply passages are in fluid communication via a cross over duct, wherein the second flow of air is drawn from one of the respective supply passages through the cross over duct into another of the respective supply passages in response to one of the gas turbine engines becoming inoperative.

17. The system of claim 16, wherein the plurality of gas turbine engines are configured, arranged and controlled to operate in a dual engine application.

18. The system of claim 16, wherein the respective plurality of supply passages are in fluid communication with a plurality of respective plenums, each of the respective plenums extending concentrically around a housing of each of the respective gas turbine engines to distribute the second flow of air concentrically into the housing.

19. The system of claim 16, wherein the one of the respective supply passages includes a damper and the one of the respective supply passages supplies the one of the gas turbine engines, and the system further comprises a controller configured to close the damper in the one of the respective supply passages in response to the one of the gas turbine engines becoming inoperative.

20. The system of claim 19, wherein the damper comprises an inflatable bladder, and the controller is configured to direct inflation of the inflatable bladder to close off the one of the respective supply passages in response to the one of the gas turbine engines becoming inoperative.

* * * * *